(12) United States Patent
Pai

(10) Patent No.: US 11,280,171 B2
(45) Date of Patent: Mar. 22, 2022

(54) AXIAL-FIELD MULTI-ARMATURE ALTERNATOR SYSTEM FOR DOWNHOLE DRILLING

(71) Applicant: Halliburton Energy Services, Inc., Houston, TX (US)

(72) Inventor: Nagaraja K. Pai, Lancaster, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 413 days.

(21) Appl. No.: 16/525,651

(22) Filed: Jul. 30, 2019

(65) Prior Publication Data

US 2020/0063543 A1 Feb. 27, 2020

Related U.S. Application Data

(60) Provisional application No. 62/723,282, filed on Aug. 27, 2018.

(51) Int. Cl.
| | |
|---|---|
| *E21B 4/04* | (2006.01) |
| *E21B 43/26* | (2006.01) |
| *E21B 41/00* | (2006.01) |
| *H02K 16/00* | (2006.01) |
| *H02K 21/24* | (2006.01) |

(52) U.S. Cl.
CPC .......... *E21B 43/26* (2013.01); *E21B 41/0085* (2013.01); *H02K 16/00* (2013.01); *H02K 21/24* (2013.01)

(58) Field of Classification Search
CPC ....... E21B 4/04; E21B 15/045; E21B 41/0085
See application file for complete search history.

(56) References Cited

U.S. PATENT DOCUMENTS

| | | | |
|---|---|---|---|
| 3,832,581 A | 8/1974 | Hoffmann et al. | |
| 5,079,461 A | 1/1992 | Schluter et al. | |
| 6,087,750 A | 7/2000 | Radd | |
| 7,201,239 B1* | 4/2007 | Perry | E21B 21/00 |
| | | | 175/101 |
| 7,423,932 B1* | 9/2008 | Jeter | E21B 47/18 |
| | | | 367/85 |
| 8,106,563 B2 | 1/2012 | Ritchey | |
| 9,584,056 B2 | 2/2017 | Ritchey | |
| 2005/0200210 A1* | 9/2005 | Kotsonis | H02K 7/088 |
| | | | 310/15 |

(Continued)

OTHER PUBLICATIONS

"Cyber Special Motors, High Temperature," Wittenstein cyber motor GmbH, www.wittenstein.cyber-motor.de, 4 pages, 2015.

(Continued)

*Primary Examiner* — Kenneth L Thompson
(74) *Attorney, Agent, or Firm* — Benjamin Ford; Baker Botts L.L.P.

(57) ABSTRACT

A downhole drilling system is disclosed. The downhole drilling system may include an axial-field multi-armature alternator system, mechanically driven by a turbine; a pulse-generating circuit electrically coupled to the axial-field multi-armature alternator system, the pulse-generating circuit receiving power from the axial-field multi-armature alternator system to provide an electric pulse; and a drill bit including a first electrode and a second electrode electrically coupled to the pulse-generating circuit to receive the electric pulse from the pulse-generating circuit.

20 Claims, 6 Drawing Sheets

(56) References Cited

U.S. PATENT DOCUMENTS

| | | | |
|---|---|---|---|
| 2009/0133867 A1* | 5/2009 | Kuckes | E21B 41/0085 |
| | | | 166/65.1 |
| 2010/0295422 A1 | 11/2010 | Sohn | |
| 2015/0034294 A1* | 2/2015 | Miles | H02K 5/1285 |
| | | | 166/66.5 |
| 2016/0348478 A1 | 12/2016 | Stahl | |
| 2017/0067332 A1* | 3/2017 | Alturbeh | H02P 21/05 |
| 2017/0362953 A1* | 12/2017 | Gatzen | E21B 41/0085 |
| 2018/0209217 A1 | 7/2018 | Money et al. | |
| 2018/0223632 A1* | 8/2018 | Rajagopalan | H02K 7/1823 |
| 2020/0295640 A1* | 9/2020 | Tegeler | H02P 9/107 |

OTHER PUBLICATIONS

"Brushless Pancake Motors," XR Series Motors and IR Series Motors, Printed Motor Works, www.printedmotorworks.com/brushless-pancake-motors/, 2 pages, Copyright © 2019.

"In-Wheel Motors," Printed Motor Works, www.printedmotorworks.com/in-wheel motors/, 2 pages, Copyright © 2019.

International Search Report and Written Opinion for PCT Patent Application No. PCT/US2019/044037, dated Feb. 24, 2020.

* cited by examiner

AXIAL-FIELD MULTI-ARMATURE ALTERNATOR SYSTEM FOR DOWNHOLE DRILLING

PRIORITY CLAIM

The present application claims priority to U.S. Provisional Patent Application Ser. No. 62/723,282, filed Aug. 27, 2018, entitled "Axial-Field Multi-Armature Alternator System For Downhole Drilling," which is incorporated by reference herein in its entirety.

TECHNICAL FIELD

The present disclosure relates generally to downhole drilling and, more particularly, to an axial-field multi-armature alternator system for downhole pulsed-power drilling.

BACKGROUND

Electrocrushing or electrohydraulic drilling uses pulsed-power technology to drill a wellbore in a rock formation. Pulsed-power technology repeatedly applies a high electric potential across the electrodes of a pulsed-power drill bit, which ultimately causes the surrounding rock to fracture. The fractured rock is carried away from the bit by drilling fluid and the bit advances downhole. Electrocrushing drilling operations may also be referred to as pulsed-power drilling operations.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Electrocrushing or electrohydraulic drilling may be used to form wellbores in subterranean rock formations for recovering hydrocarbons, such as oil and gas, from these formations. Electrocrushing or electrohydraulic drilling uses pulsed-power technology to repeatedly fracture the rock formation by repeatedly delivering electrical arcs or high-energy shock waves to the rock formation. More specifically, a drill bit of a pulsed-power drilling system is excited by a train of high-energy electrical pulses that produce high power discharges through the formation at the downhole end of the drill bit. The high-energy electrical pulses, in turn, fracture part of the formation surrounding the drilling tool and produce electromagnetic and acoustic waves.

Certain components of a pulsed-power drilling system may be located downhole. For example, an axial-field multi-armature alternator power system and/or a pulse-generating circuit may be located in a bottom-hole assembly (BHA) near the pulsed-power drill bit. The axial-field multi-armature alternator power system can provide power to the pulse-generating circuit at required power levels, e.g., 500 kilowatts or higher. The axial-field multi-armature alternator power system can include alternating stacks of magnetic assemblies and armatures to achieve the desired power output, e.g., the power needed by the pulsed-power drill bit.

There are numerous ways in which an axial-field multi-armature power source may be implemented in a downhole pulsed-power drilling system. Thus, embodiments of the present disclosure and its advantages are best understood by referring to FIGS. 1 through 4, where like numbers are used to indicate like and corresponding parts.

Figure 1:
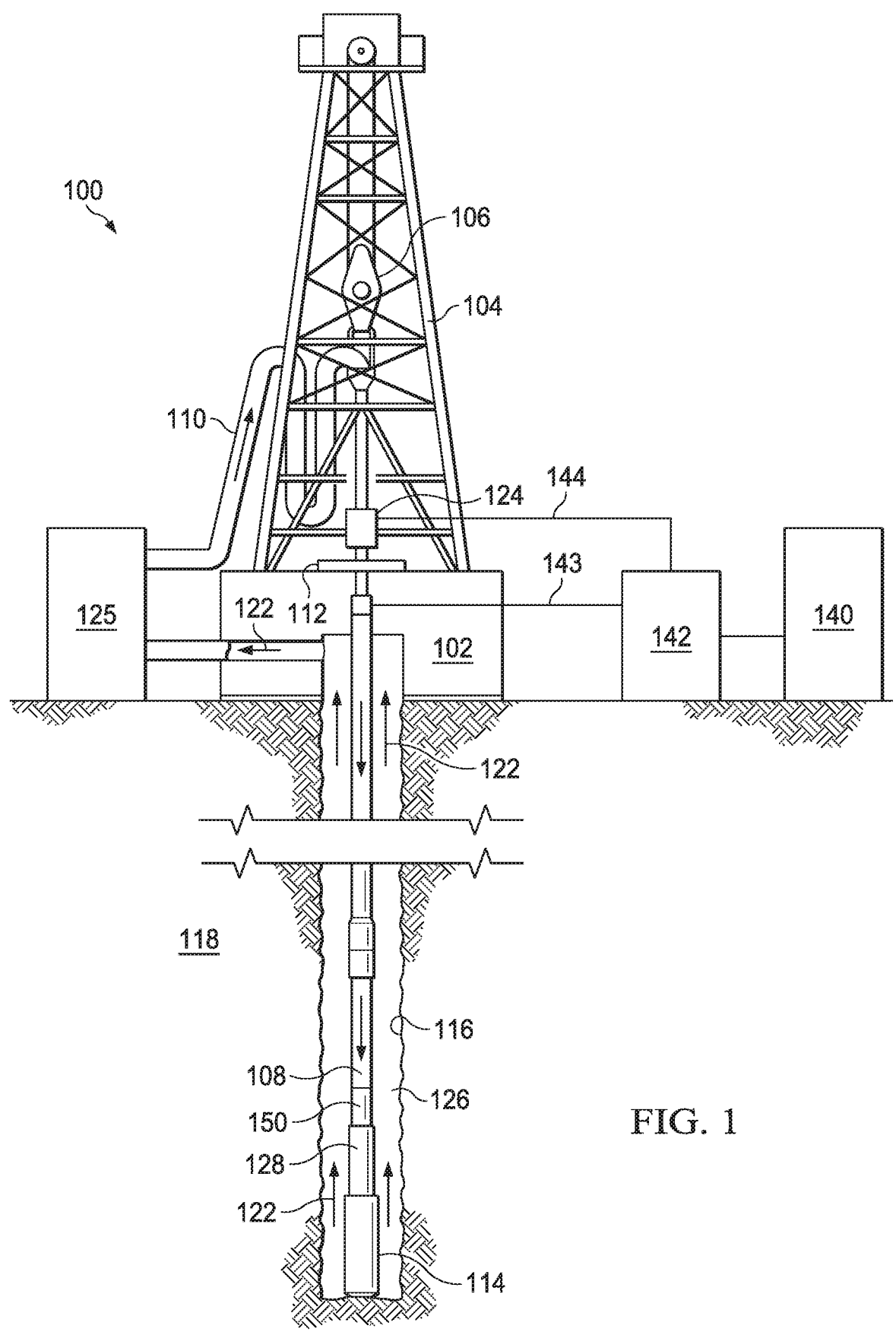
FIG. 1 is an elevation view of an exemplary downhole pulsed-power drilling system used in a wellbore environment.

FIG. 1 is an elevation view of an exemplary pulsed-power drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 also includes pump 125, which circulates pulsed-power drilling fluid 122 through a feed pipe to kelly 110, which in turn conveys pulsed-power drilling fluid 122 downhole through interior channels of drill string 108 and through one or more orifices in pulsed-power drill bit 114. Pulsed-power drilling fluid 122 then circulates back to the surface via annulus 126 formed between drill string 108 and the sidewalls of wellbore 116. Fractured portions of the formation are carried to the surface by pulsed-power drilling fluid 122 to remove those fractured portions from wellbore 116.

Pulsed-power drill bit 114 is attached to the distal end of drill string 108 and may be an electrocrushing drill bit or an electrohydraulic drill bit. Power to pulsed-power drill bit 114 may be supplied by axial-field multi-armature alternator power system 150, described further herein. A pulse-generating circuit within BHA 128 may receive the electrical energy from axial-field multi-armature alternator power system 150, and may generate high-energy pulses to drive pulsed-power drill bit 114. The pulse-generating circuit may be physically positioned between axial-field multi-armature power system 150 and drill bit 114. Axial-field multi-armature power system 150 may be mechanically coupled to a turbine (e.g., a mud turbine).

The axial-field multi-armature power system 150 can generate power through the movement of magnetic fields thereby producing a current that can be harnessed by the system 150. By rotating the magnet assembly of the axial-field multi-armature power system 150, an electric current is created in conductor coils (not shown) of the system 150. The axial-field multi-armature power system 150 is able to provide such power to other systems of the drilling system 100, and in particular, a pulse-generating circuit.

Drilling system 100 may further include a generator to generate electrical power in addition to the axial-field multi-armature alternator power system 150. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108 or attached to the side of drill string 108.

The pulse-generating circuit within BHA 128 may be utilized to repeatedly apply a high electric potential, for example up to or exceeding 150 kV, across the electrodes of pulsed-power drill bit 114. Each application of electric potential is referred to as a pulse. When the electric potential across the electrodes of pulsed-power drill bit 114 is increased enough during a pulse to generate a sufficiently high electric field, an electrical arc forms through a rock formation at the bottom of wellbore 116. The arc temporarily forms an electrical coupling between the electrodes of pulsed-power drill bit 114, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure are sufficiently high to break the rock itself into small bits or cuttings. This fractured rock is removed, typically by pulsed-power drilling fluid 122, which moves the fractured rock away from the electrodes and uphole. The terms "uphole" and "downhole" may be used to describe the location of various components of drilling system 100 relative to the bottom or end of wellbore 116 shown in FIG. 1. For example, a first component described as uphole from a second component may be further away from the end of wellbore 116 than the second component. Similarly, a first component described as being downhole from a second component may be located closer to the end of wellbore 116 than the second component.

As pulsed-power drill bit 114 repeatedly fractures the rock formation and pulsed-power drilling fluid 122 moves the fractured rock uphole, wellbore 116, which penetrates various subterranean rock formations 118, is created. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Although pulsed-power drill bit 114 is described above as implementing electrocrushing drilling, pulsed-power drill bit 114 may also be used for electrohydraulic drilling, rather than generating an electrical arc within the rock, drill bit 114 applies a large electrical potential across one or more electrodes and a ground ring to form an arc across the drilling fluid proximate to the downhole end of wellbore 116. The high temperature of the arc vaporizes the portion of the drilling fluid immediately surrounding the arc, which in turn generates a high-energy shock wave in the remaining fluid. The one or more electrodes of electrohydraulic drill bit may be oriented such that the shock wave generated by the arc is transmitted toward the bottom of wellbore 116. When the shock wave contacts and bounces off of the rock at the bottom of wellbore 116, the rock fractures. Accordingly, wellbore 116 may be formed in subterranean formation 118 using drill bit 114 that implements either electrocrushing or electrohydraulic drilling.

Although pulsed-power drill bit 114 is described above as implementing electrocrushing drilling, pulsed-power drill bit 114 may also be used for electrohydraulic drilling Although pulsed-power drill bit 114 is described above as utilizing an electrocrushing drill bit, pulsed-power drill bit 114 may also utilize an electrohydraulic drill bit. An electrohydraulic drill bit may have one or more electrodes and electrode spacing configurations similar to electrocrushing drill bit 114. But, rather than generating an arc within the rock, an electrohydraulic drill bit applies a large electrical potential across the one or more electrodes and the ground ring to form an arc across the drilling fluid proximate the bottom of wellbore 116. The high temperature of the arc vaporizes the portion of the fluid immediately surrounding the arc, which in turn generates a high-energy shock wave in the remaining fluid. The one or more electrodes of electrohydraulic drill bit may be oriented such that the shock wave generated by the arc is transmitted toward the bottom of wellbore 116. When the shock wave hits and bounces off of the rock at the bottom of wellbore 116, the rock fractures. Accordingly, drilling system 100 may utilize pulsed-power technology with an electrohydraulic drill bit to drill wellbore 116 in subterranean formation 118 in a similar manner as with an electrocrushing drill bit.

Figure 2A:
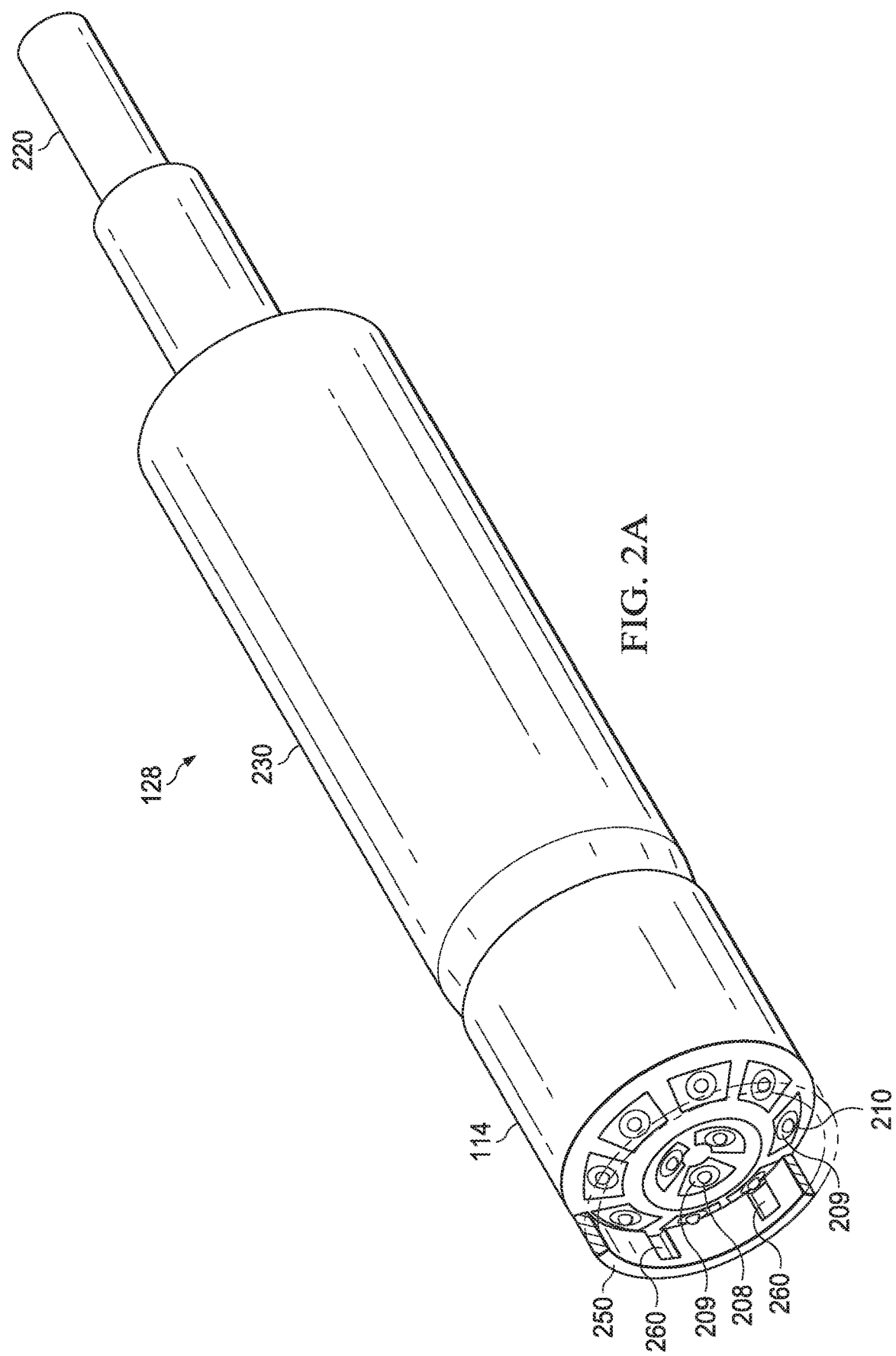
FIG. 2A is a perspective view of exemplary components of a bottom-hole assembly for a downhole pulsed-power drilling system.

FIG. 2A is a perspective view of exemplary components of the bottom-hole assembly for a pulsed-power drilling system. BHA 128 may include pulsed-power tool 230 and drill bit 114. For the purposes of the present disclosure, pulsed-power drill bit 114 may be integrated within BHA 128, or may be a separate component that is coupled to BHA 128.

Pulsed-power tool 230 may provide pulsed electrical energy to pulsed-power drill bit 114. Pulsed-power tool 230 receives electrical power from axial-field multi-armature alternator system 150. Pulsed-power tool 230 may also receive electrical power via a combination of axial-field multi-armature alternator system 150 and a power source located on the surface through cable 220. Pulsed-power tool 230 converts electrical power received from the power source into high-energy electrical pulses that are applied across electrodes 208 and ground ring 250 of pulsed-power drill bit 114. Pulsed-power tool 230 may also apply high-energy electrical pulses across electrode 210 and ground ring 250 in a similar manner as described herein for electrode 208 and ground ring 250. Pulsed-power tool 230 may include a pulse-generating circuit as described above in reference to FIG. 1, which may be physically positioned between axial-field multi-armature power system 150 and the drill bit 114

Referring to FIG. 1 and FIG. 2A, pulsed-power drilling fluid 122 may exit drill string 108 via openings 209 surrounding each electrode 208 and each electrode 210. The flow of pulsed-power drilling fluid 122 out of openings 209 allows electrodes 208 and 210 to be insulated by the drilling fluid. Pulsed-power drill bit 114 may include a solid insulator (not expressly shown in FIG. 1 or 2A) surrounding electrodes 208 and 210 and one or more orifices (not expressly shown in FIG. 1 or 2A) on the face of pulsed-power drill bit 114 through which pulsed-power drilling fluid 122 exits drill string 108. Such orifices may be simple holes, or they may be nozzles or other shaped features. Because fines are not typically generated during pulsed-power drilling, as opposed to mechanical drilling, pulsed-power drilling fluid 122 may not need to exit the drill bit at as high a pressure as the drilling fluid in mechanical drilling. As a result, nozzles and other features used to increase drilling fluid pressure may not be needed. However, nozzles or other features to increase pulsed-power drilling fluid 122 pressure or to direct pulsed-power drilling fluid may be included for some uses.

Pulsed-power drilling fluid 122 is typically circulated through drilling system 100 at a flow rate sufficient to remove fractured rock from the vicinity of pulsed-power drill bit 114. In addition, pulsed-power drilling fluid 122 may be under sufficient pressure at a location in wellbore 116, particularly a location near a hydrocarbon, gas, water, or other deposit, to prevent a blowout.

In addition, pulsed-power drill bit 114 may include ground ring 250, shown in part in FIG. 2A. Ground ring 250 may function as an electrode. Although illustrated as a contiguous ring in FIG. 2A, ground ring 250 may be non-contiguous discrete electrodes and/or implemented in different shapes. Electrodes 208 and 210 may be at least 0.4 inches (i.e., at least approximately 10 millimeters) apart from ground ring 250 at their closest spacing, at least 1 inch apart at their closest spacing, at least 1.5 inches (i.e., at least approximately 38 millimeters) apart at their closest spacing, or at least 2 inches (i.e., at least approximately 51 millimeters) apart at their closest spacing.

If drilling system 100 experiences vaporization bubbles in pulsed-power drilling fluid 122 near pulsed-power drill bit 114, the vaporization bubbles may have deleterious effects. For instance, vaporization bubbles near electrodes 208 or 210 may impede formation of the arc in the rock. Pulsed-power drilling fluid 122 may be circulated at a flow rate also sufficient to remove vaporization bubbles from the vicinity of electrocrushing drill bit 114. Although not all pulsed-power drill bits 114 may have ground ring 250, if it is present, it may contain passages 260 to permit the flow of electrocrushing drilling fluid 122 along with any fractured rock or bubbles away from electrodes 208 and 210 and uphole.

Figure 2B:
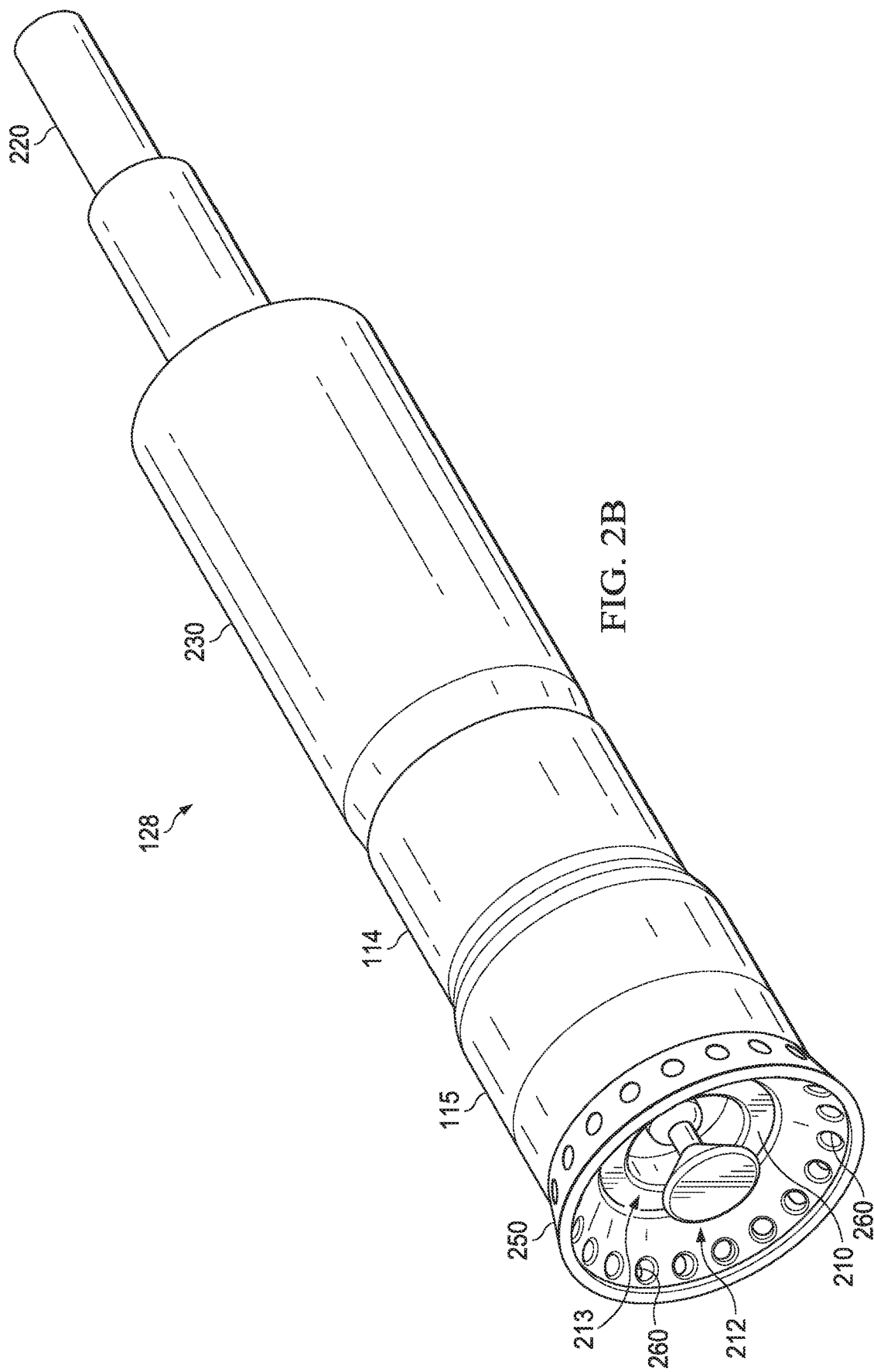
FIG. 2B is a perspective view of exemplary components of a bottom-hole assembly for a downhole pulsed-power drilling system.

FIG. 2B is a perspective view of exemplary components of a bottom-hole assembly for downhole pulsed-power drilling system 100. BHA 128 may include pulsed-power tool 230 and drill bit 114. For the purposes of the present disclosure, drill bit 114 maybe integrated within BHA 128, or may be a separate component that is coupled to BHA 128. BHA and pulsed-power tool 230 may include features and functionalities discussed above in FIG. 2A. For example, pulsed-power drilling fluid 122 may exit drill string 108 via opening 213 surrounding electrode 212. The flow of pulsed-power drill fluid 122 out of opening 213 allows electrode 212 to be insulated by the pulsed-power drilling fluid. While one electrode 212 is shown in FIG. 2B, pulsed-power drill bit 114 may include multiple electrodes 212. Pulsed-power drill bit 114 may include solid insulator 210 surrounding electrode 212 and one or more orifices (not expressly shown in FIG. 2B) on the face of pulsed-power drill bit 114 through which pulsed-power drilling fluid 122 exits drill string 108. Nozzles or other features to increase pulsed-power drilling fluid 122 pressure or to direct pulsed-power drilling fluid may be included for some uses. Additionally, the shape of solid insulator 210 may be selected to enhance the flow of pulsed-power drilling fluid 122 around the components of pulsed-power drill bit 114.

Pulsed-power drill bit 114 may include bit body 115, electrode 212, ground ring 250, and solid insulator 210. Electrode 212 may be placed approximately in the center of pulsed-power drill bit 114. Electrode 212 may be positioned at a minimum distance from ground ring 250 of approximately 0.4 inches and at a maximum distance from ground ring 250 of approximately 4 inches. The distance between electrode 212 and ground ring 250 may be based on the parameters of the pulsed drilling operation and/or on the dimeter of drill bit 114. For example, the distance between electrode 212 and ground ring 250, at their closest spacing, may be at least 0.4 inches, at least 1 inch, at least 1.5 inches, or at least 2 inches. The distance between electrode 212 and ground ring 250 may be generally symmetrical or may be asymmetrical such that the electric field surrounding the pulsed-power drill bit 114 has a symmetrical or asymmetrical shape. The distance between electrode 212 and ground ring 250 allows pulsed-power drilling fluid 122 to flow between electrode 212 and ground ring 250 to remove vaporization bubbles from the drilling area.

Electrode 212 may have any suitable diameter based on the drilling operation, on the distance between electrode 212 and ground ring 250, and/or on the dimeter of drill bit 114. For example, electrode 212 may have a diameter between approximately two and approximately ten inches (i.e., between approximately 51 and approximately 254 millimeters).

Ground ring 250 may function as an electrode and provide a location on the pulsed-power drill bit where an arc may initiate and/or terminate. Drill bit 114 may also include one or more fluid flow ports 260 on the face of the drill bit through which drilling fluid exits the drill string 108. For example, ground ring 250 of drill bit 114 may include one or more fluid flow ports 260 such that pulsed-power drilling fluid 122 flow through fluid flow ports 260 carry fractured rock and vaporization bubbles away from the drilling area. Fluid flow ports 260 may be simple holes, or they may be nozzles or other shaped features. Drilling fluid 122 is typically circulated through drilling system 100 at a flow rate sufficient to remove fractured rock from the vicinity of drill bit 114. In addition, drilling fluid 122 may be under sufficient pressure at a location in wellbore 116, particularly a location near a hydrocarbon, gas, water, or other deposit, to prevent a blowout. Drilling fluid 122 may exit drill string 108 via opening 213 surrounding electrode 212. The flow of drilling fluid 122 out of opening 213 allows electrode 212 to be insulated by the drilling fluid. Because fines are not typically generated during pulsed-power drilling, as opposed to mechanical drilling, drilling fluid 122 may not need to exit the drill bit at as high a pressure as the drilling fluid in mechanical drilling. As a result, nozzles and other features used to increase drilling fluid pressure may not be needed on drill bit 114. However, nozzles or other features to increase drilling fluid 122 pressure or to direct drilling fluid may be included for some uses. Additionally, the shape of solid insulator 20 may be selected to enhance the flow of drilling fluid 122 around the components of drill bit 114.

As described above with reference to FIGS. 1, 2A, and 2B, when the electric potential across electrodes of a pulsed-power drill bit becomes sufficiently large, an electrical arc forms through the rock formation and/or drilling fluid that is near the electrodes. The arc provides a temporary electrical short between the electrodes, and thus allows electric current to flow through the arc inside a portion of the rock formation and/or drilling fluid at the bottom of the wellbore. The arc increases the temperature of the portion of the rock formation through which the arc flows and the surrounding formation and materials. The temperature is sufficiently high to vaporize any water or other fluids that might be proximate to the arc and may also vaporize part of the rock itself. The vaporization process creates a high-pressure gas which expands and, in turn, fractures the surrounding rock.

Pulsed-power drilling systems and pulsed-power tools may utilize any suitable pulse-generating circuit topology to generate and apply high-energy electrical pulses across electrodes within the pulsed-power drill bit. Such pulse-generating circuit topologies may utilize electrical resonance to generate the high-energy electrical pulses required for pulsed-power drilling. The pulse-generating circuit may be shaped and sized to fit within the circular cross-section of pulsed-power tool 230, which as described above with reference to FIGS. 2A and 2B, may form part of BHA 128. The pulse-generating circuit may be enclosed within an encapsulant, such a thermally conductive material that protects the pulse-generating circuit from the wide range of temperatures (for example, from approximately 10 to approximately 200 degrees Centigrade) within the wellbore.

The pulsed-power drilling systems described herein may generate multiple electrical arcs per second using a specified excitation current profile that causes a transient electrical arc to form and arc through the most conducting portion of the wellbore floor. As described above, the arc causes that portion of the wellbore floor to disintegrate or fragment and be swept away by the flow of drilling fluid. As the most conductive portions of the wellbore floor are removed, subsequent electrical arcs may naturally seek the next most conductive portion. Therefore, obtaining measurements from which estimates of the excitation direction can be generated may provide information usable in determining characteristics of the formation.

Figure 3A:
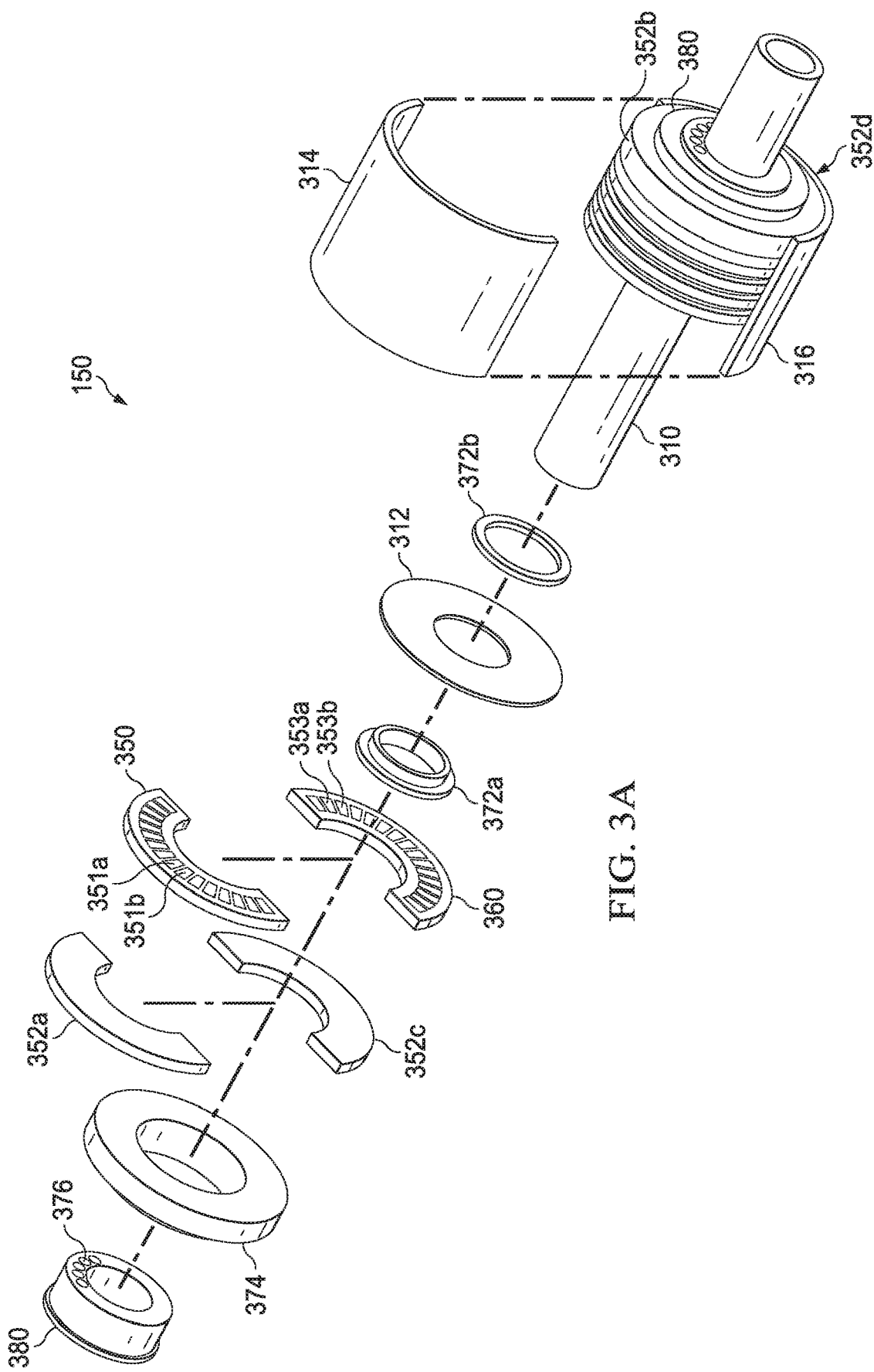
FIG. 3A illustrates an exploded perspective view of an axial-field multi-armature alternator system.
Figure 3B:
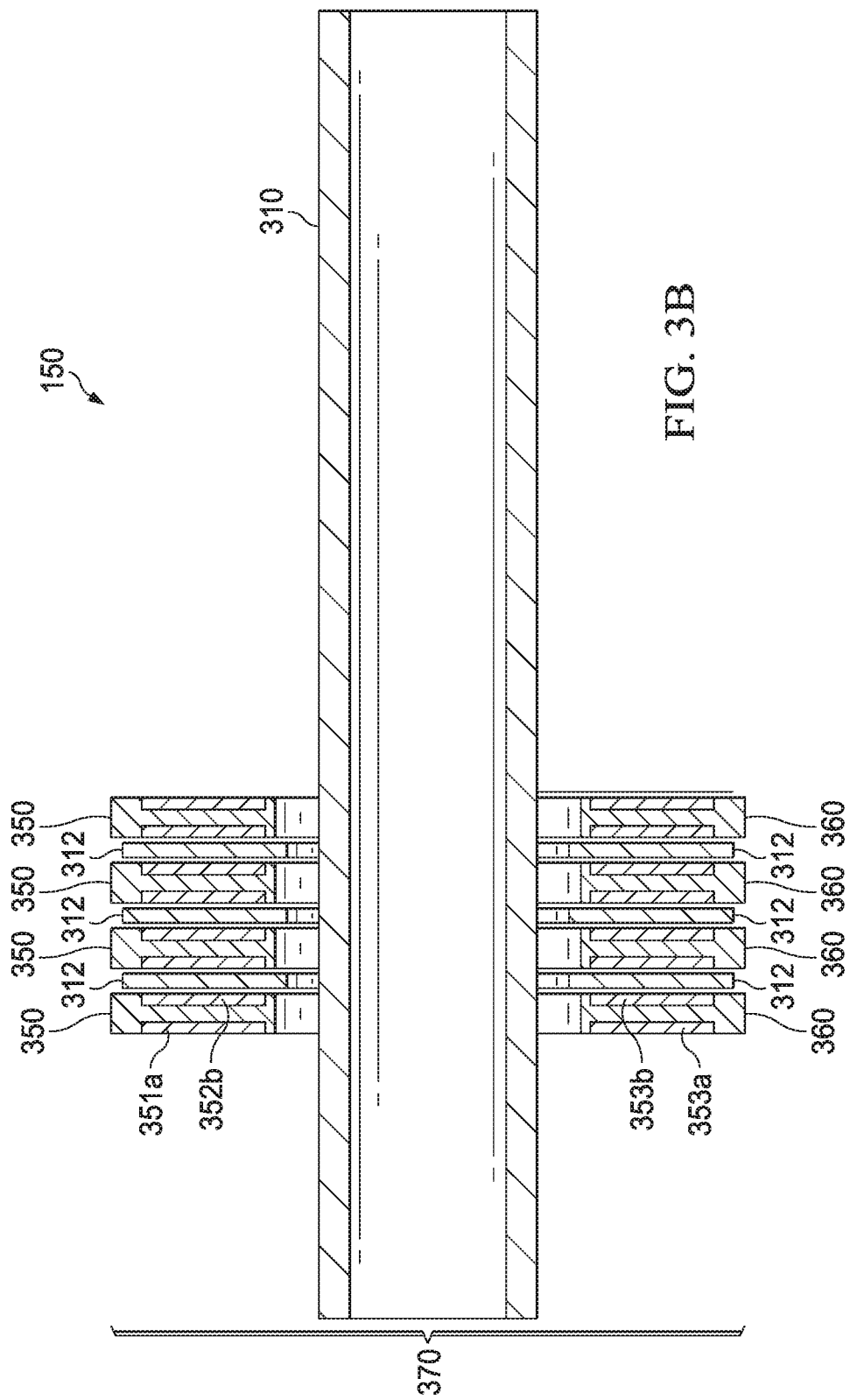
FIG. 3B illustrates a side view of the axial-field multi-armature alternator system.

FIGS. 3A, 3B illustrates a perspective view and a side view, respectively, of the axial-field multi-armature alternator system 150. Specifically, the axial-field multi-armature alternator system 150 can provide power to the pulsed-power tool 230 or the pulse-generating circuit, as described herein. The axial-field multi-armature alternator system 150 can provide power to the pulsed-power tool 230 or the pulse-generating circuit of greater than 1 kilowatt (kW), greater than 150 kW, or greater than 500 kW.

The system 150 can include a core shaft 310, a plurality of armatures 312, a first outer body 314, and a second outer body 316. The armatures 312 can be physically coupled to the core shaft 310. The armatures 312 can be affixed to the core shaft 310 and are stationary with respect to the core shaft 310. The system 150 can include any number of armatures 312 depending the application desired. For example, the system 150 can include a number of armatures 312 based on a desired power output (e.g., 500 kW).

Each armature 312 can be spaced-apart from a neighboring armature 312 a particular distance. For example, each armature 312 is spaced-apart from a neighboring armature 312 a distance based on a thickness of a magnetic assembly to be positioned therebetween, described further herein. Each armature 312 can be electrically coupled to each neighboring armature 312. For example, each armature 312 can be electrically coupled to each neighboring armature 312 by one or more electrical wires (not shown). One or more of the armatures 312 can be ironless. The core shaft 310 can pass through each of the armatures 312. That is, the armatures 312 can have a washer-type (or ring-type) geometric shape, with an inner diameter of the armatures 312 being substantially the same as (or marginally bigger than) a diameter of the core shaft 310. The core shaft 310 can be hollow or solid.

The first outer body 314 is coupled to a first plurality of magnetic assemblies 350. For example, the magnetic assemblies 350 can be physically coupled to the first outer body 312, e.g., through coupling screws, rivets, or welds. The first outer body 314 can include a number of magnetic assemblies 350 that corresponds to the number of armatures 312. The number of magnetic assemblies 350 can be the same as the number of armatures 312. The magnetic assemblies 350 can be spaced-apart from each other based on a thickness of the armatures 312. That is, when the first outer body 314 is positioned proximate to the core shaft 310, the magnetic assemblies 350 are positioned between respective armatures 312. Each of the magnetic assemblies 350 can include a plurality of alternating magnetic pole portions 351a, 351b (collectively referred to as alternating magnetic pole portions 351). The magnetic assemblies 350 can be comprised of high temperature neodymium (NdFeB) and/or samarium cobalt (SmCo). Each magnetic assembly 350 can include a half-washer-type geometric shape. Each magnetic assembly 350 can include any number sections (e.g., 2, 3, or more). The sections can be spaced-apart from a neighboring section such that when the sections are combined, form the half-washer-type geometric shape of the magnetic assembly 350. Each magnetic assembly 350 can include a whole (or substantially whole) washer-type geometric shape.

As illustrated, the first outer body 314 surrounds the first plurality of magnetic assemblies 350. That is, when the first outer body 314 is positioned proximate to the core shaft 310, the magnetic assemblies 350 are positioned between the first outer body 314 and the core shaft 310. The first outer body 314 can further include back plates 352a, 352b. The backplates 352a, 352b can also include a half-washer-type geometric shape.

The second outer body 316 can be similar to the first outer body 314. Specifically, the second outer body 316 is coupled to a second plurality of magnetic assemblies 360. For example, the magnetic assemblies 360 can be physically coupled to the second outer body 316, e.g., through coupling screws, rivets, or welds. The second outer body 316 can include a number of magnetic assemblies 360 that corresponds to the number of armatures 312 (as well as corresponds to the number of magnetic assemblies 350). The number of magnetic assemblies 360 can be the same as the number of armatures 312. The magnetic assemblies 360 can be spaced-apart from each other based on a thickness of the armatures 312. That is, when the second outer body 316 is positioned proximate to the core shaft 310, the magnetic assemblies 360 are positioned between respective armatures 312. Each of the magnetic assemblies 360 can include a plurality of alternating magnetic pole portions 361a, 361b (collectively referred to as alternating magnetic pole portions 361). The magnetic assemblies 360 can be comprised of high temperature neodymium (NdFeB) and/or samarium cobalt (SmCo). Each magnetic assembly 360 can include a half-washer-type (or half-ring-type) geometric shape. Each magnetic assembly 360 can include any number sections (e.g., 2, 3, or more). The sections can be spaced-apart from a neighboring section such that when the sections are combined, form the half-washer-type geometric shape of the magnetic assembly 360. Each magnetic assembly 350 can include a whole (or substantially whole) washer-type geometric shape.

As illustrated, the second outer body 316 surrounds the second plurality of magnetic assemblies 360. That is, when the second outer body 316 is positioned proximate to the core shaft 310, the magnetic assemblies 360 are positioned between the second outer body 316 and the core shaft 310. The second outer body 316 can further include back plates 352c, 352d. The back plates 352c, 352d can also include a half-washer-type geometric shape.

The magnetic assemblies 350 and 360 can form respective sets of corresponding magnetic assemblies. That is, when the first outer body 314 and the second outer body 316 are positioned proximate to the core shaft 310, and specifically, positioned opposite to one another, the magnetic assemblies 350 and 360 form respective sets of corresponding magnetic assemblies. The magnetic assemblies 350 and 360 are positioned between respective armatures 312, as described herein. That is, when the magnetic assemblies 350 and 360 are positioned as such, positionally opposite magnetic assemblies 350, 360 form a particular set of magnetic assemblies.

Each set of such magnetic assemblies 350, 360 that are positioned opposite of one another can form a washer-type (or ring-type) geometric shape that substantially surrounds the core shaft 310. As described herein, each magnetic assembly 350, 360 is of a half-washer-type (or half-ring-type) geometric shape. Thus, when each magnetic assembly 350, 360 is formed into a set of positionally opposite magnetic assemblies 350, 360, each half-washer-type (or half-ring-type) geometric shape forms a whole (or substantially whole) washer-type (or ring-type) geometric shape.

Similarly, each of the back plates 352a, 352b can form a whole (or substantially whole) washer-type (or ring-type) geometric shape; and each of the back plates 352c, 352d can form a whole (or substantially whole) washer-type (or ring-type) geometric shape. Thus, the back plate 352a, 352c combination and the back plate 352b, 352d combination can surround magnetic assemblies 350 that are positioned at opposite ends.

The first outer body 314 and the second outer body 316 can be positioned proximate to the core shaft 310, the first outer body 314 and the second outer body 316 substantially surround the armatures 312. That is, the first outer body 314 and the second outer body 316 are positioned to form a cylindrical shape (with back plates 352a, 352b, 352c, 352d forming the ends of the cylindrical shape) that substantially surrounds the armatures 312 (as well as the magnetic assemblies 350, 360).

The first outer body 314 and the second outer body 316 can be rotatable around the core shaft 310. That is, when the first outer body 314 and the second outer body 316 are positioned proximate to the core shaft 310, the first outer body 314, the second outer body 316, and the magnetic assemblies 350, 360 form a rotatable body 370 that is rotatable around the core shaft 310. For example, the rotatable body 370 rotates in response to generation of magnetic fields by the axial-field multi-armature alternator system 150, described further herein. As such, the axial-field multi-armature alternator system 150 is able to generate power to provide to other systems coupled to the axial-field multi-armature alternator system 150, e.g., the pulsed-power tool 230.

As the first outer body 314 and the second outer body 316 are positioned proximate to the core shaft 310 to form the rotatable body 370, for each armature 310, a first set of corresponding magnetic assemblies 350, 360 and a second set of corresponding magnetic assemblies 350, 360 surround the armature 312.

The axial-field multi-armature alternator system 150 can further include a first hub 372a and a second hub 372b (referred to as hubs 372) that surround each armature 312. The hubs 372 can provide spacing between each armature 312 such that the magnetic assemblies 350, 360 are able to be positioned between the armatures 312—e.g., when the rotatable body 370 is formed. The hubs 372 can also provide coupling between the armatures 312 and the core shaft 310.

The axial-field multi-armature alternator system 150 can further include a bearing 374 (or multiple bearings 374) coupled to the core shaft 310. The number of bearings 374 can depend on the number of armatures 312, magnetic assemblies 350, 360, and the overall length of the rotatable body 370. The bearings 374 can provide mechanical stability to the rotatable body 370, and can be located at any location along the core shaft 310.

The axial-field multi-armature alternator system 150 can further include endcaps 380. The endcaps 380 can further include passageways 376, e.g., for cordage running therethrough that is coupled to one or more of other components of the axial-field multi-armature alternator system 150.

As a result of each armature 312 being electrically coupled to each neighboring armature 312, the magnetic fields generated by each set of magnetic assemblies 350, 360 and the corresponding armature 312 can be cumulative. As a result, the power generated by each armature 312 being electrically coupled to each neighboring armature 312 is cumulative. Thus, the axial-field multi-armature alternator system 150 can include an appropriate number of armatures 312 and magnetic assemblies 350, 360 to obtain a desired power level, e.g., dependent on the application desired.

The axial-field multi-armature alternator system 150 can be implemented in any downhole drilling assembly, including a pulsed-power or electrohydraulic environment. Further, the axial-field multi-amateur alternator system 150 can be implemented in such environments that need power at various levels (from a few watts to over 500 kW). Other applications can include downhole assemblies that include electronics for measurements, directional control, and communication.

Figure 4:
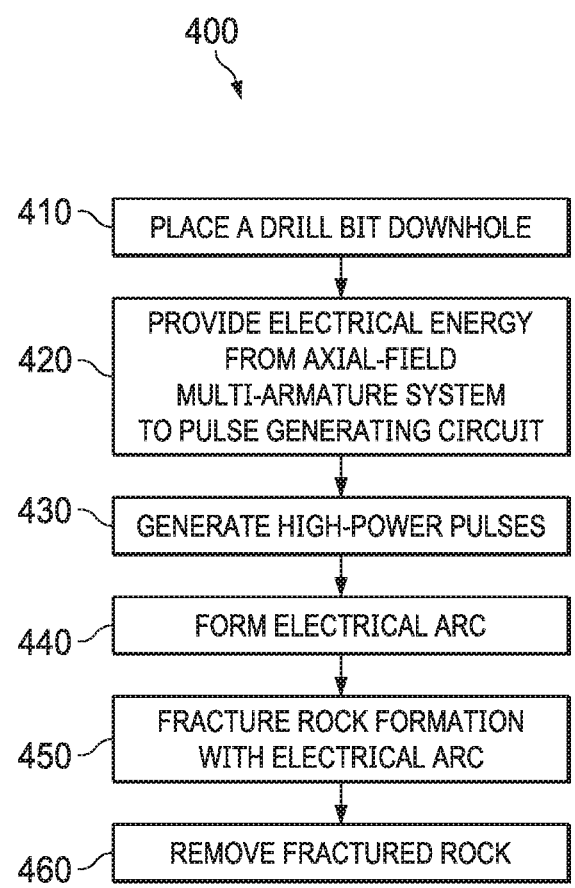
FIG. 4 is a flow chart of exemplary method for drilling a wellbore.

FIG. 4 illustrates a flow chart of an exemplary method 400 for drilling a wellbore.

Method 400 may begin and at step 410 a pulsed-power or electrohydraulic drill bit may be placed downhole in a wellbore. For example, drill bit 114 may be placed downhole in wellbore 116 as shown in FIG. 1. At step 420, electrical energy is provided from the axial-field multi-armature alternator system 150 to a pulse-generating circuit coupled to a first electrode and a second electrode of the drill bit. The axial-field multi-armature power system 150 can generate the electrical energy through the movement of the magnetic assemblies 350, 360, for example, by a turbine mechanically coupled to the axial-field multi-armature power system 150. By rotating the magnetic assemblies 350, 360 of the axial-field multi-armature power system 150, electrical energy is created in conductor coils (not shown) of the system 150. The axial-field multi-armature power system 150 is able to provide such electrical energy to the pulse-generating circuit.

The first electrode may be electrode 208, 210, or 212 and the second electrode may be ground ring 250 discussed above with respect to FIGS. 2A and 2B. For example, as described above with reference to FIG. 3, pulse-generating circuit 150 may be implemented within pulsed-power tool 230 of FIGS. 2A and 2B.

At step 430, the pulse-generating circuit generates high-energy electric pulses for use of the pulsed-power drill bit. For example, the pulse-generating circuit may generate high-energy electrical pulses capable of applying at least 150 kV across electrodes of the drill bit. At step 440, an electrical arc may be formed between the first electrode and the second electrode of the drill bit. At step 450, the rock formation at an end of the wellbore may be fractured with the electrical arc. For example, as described above with reference to FIGS. 1 and 2, the arc greatly increases the temperature of the portion of the rock formation through which the arc flows as well as the surrounding formation and materials. The temperature is sufficiently high to vaporize any water or other fluids that may be touching or near the arc and may also vaporize part of the rock itself. The vaporization process creates a high-pressure gas which expands and, in turn, fractures the surrounding rock.

At step 460, fractured rock may be removed from the end of the wellbore. For example, as described above with reference to FIG. 1, pulsed-power drilling fluid 122 may move the fractured rock away from the electrodes and uphole away from the drill bit. As described above with respect to FIGS. 2A and 2B, pulsed-power drilling fluid 122 and the fractured rock may pass away from electrodes through passages 260 in the drill bit. Subsequently, method 400 may end.

Modifications, additions, or omissions may be made to method 400 without departing from the scope of the disclosure. For example, the order of the steps may be performed in a different manner than that described and some steps may be performed at the same time. Additionally, each individual step may include additional steps without departing from the scope of the present disclosure.

Embodiments herein may include:

A. A downhole drilling system, including an axial-field multi-armature alternator system; a pulse-generating circuit electrically coupled to the axial-field multi-armature alternator system, the pulse-generating circuit receiving power from the axial-field multi-armature alternator system to provide an electric pulse; and a drill bit including a first electrode and a second electrode electrically coupled to the pulse-generating circuit to receive the electric pulse from the pulse-generating circuit.

B. An axial-field multi-armature alternator system for providing power in a downhole drilling system, the system including a core shaft; a plurality of armatures physically coupled to the core shaft, wherein each armature is spaced-apart from a neighboring armature a distance, and wherein each armature is electrically coupled to each neighboring armature; a first outer body coupled to a first plurality of magnetic assemblies, wherein the first outer body surrounds the first plurality of magnetic assemblies; and a second outer body coupled to a second plurality of magnetic assemblies, wherein the second outer body surrounds the second plurality of magnetic assemblies, wherein, for each armature, a first set of corresponding magnetic assemblies of the first plurality of magnetic assemblies and a second set of corresponding magnetic assemblies of the second plurality of magnetic assemblies surrounds the armature.

C. A method, including placing a drill bit downhole in a wellbore; providing electrical power from an axial-field multi-armature alternator system to a pulse-generating circuit electrically coupled to the drill bit; generating an electric pulse with the pulse-generating circuit; forming an electrical arc between a first electrode and a second electrode of the drill bit; fracturing a rock formation at an end of the wellbore with the electrical arc; and removing fractured rock from the end of the wellbore.

Embodiments A and C may have one or more of the following additional elements in any combination: Element 1: wherein the axial-field multi-armature alternator system includes: a core shaft; a plurality of armatures physically coupled to the core shaft, wherein each armature is spaced-apart from a neighboring armature a distance, and wherein each armature is electrically coupled to each neighboring armature; a first outer body coupled to a first plurality of magnetic assemblies, wherein the first outer body surrounds the first plurality of magnetic assemblies; and a second outer body coupled to a second plurality of magnetic assemblies, wherein the second outer body surrounds the second plurality of magnetic assemblies, wherein, for each armature, a first set of corresponding magnetic assemblies of the first plurality of magnetic assemblies and a second set of corresponding magnetic assemblies of the second plurality of magnetic assemblies surrounds the armature. Element 2: wherein each set of corresponding magnetic assemblies has a washer-type geometric shape. Element 3: wherein each magnetic assembly of each set of corresponding magnetic assemblies has a half-washer-type geometric shape. Element 4: wherein the axial-field multi-armature alternator system provides greater than 50 kW of power to the pulse-generating circuit. Element 5: wherein the axial-field multi-armature alternator system provides greater than 150 kW of power to the pulse-generating circuit. Element 6: wherein the axial-field multi-armature alternator systems provides greater than 150 kW of power to the pulse-generating circuit. Element 7: wherein the pulse-generating circuit is physically positioned between the axial-field multi-armature alternator system and the drill bit. Element 8: wherein the system further includes a turbine mechanically coupled to the axial-field multi-armature alternator system. Element 9: wherein the electric pulse from the pulse-generating circuit applies a voltage of approximately 150 kV across the first electrode and the second electrode. Element 10: wherein the drill bit is one of an electrocrushing drill bit and an electrohydraulic drill bit.

Embodiment B may have one or more of the following additional elements in any combination: Element 1: wherein the core shaft passes through each of the armatures. Element 2: wherein each set of corresponding magnetic assemblies has a washer-type geometric shape. Element 3: wherein each magnetic assembly of each set of corresponding magnetic assemblies has a half-washer-type geometric shape. Element 4: wherein the first and the second outer body surround the plurality of armatures. Element 5: wherein the first outer body and the second outer body are rotatable around the core shaft. Element 6: further comprising a first and a second hub surrounding each armature. Element 7: further comprising a bearing coupled to the core shaft. Element 8: wherein the axial-field multi-armature alternator system is integrated within a bottom-hole assembly.

Although the present disclosure has been described with several embodiments, various changes and modifications may be suggested to one skilled in the art. It is intended that the present disclosure encompasses such various changes and modifications as falling within the scope of the appended claims.

What is claimed is:

1. A downhole drilling system, comprising:
   an axial-field multi-armature alternator system;
   a pulse-generating circuit electrically coupled to the axial-field multi-armature alternator system, the pulse-generating circuit receiving power from the axial-field multi-armature alternator system to provide an electric pulse; and
   a drill bit including a first electrode and a second electrode electrically coupled to the pulse-generating circuit to receive the electric pulse from the pulse-generating circuit.

2. The downhole drilling system of claim 1, wherein the axial-field multi-armature alternator system includes:
   a core shaft;
   a plurality of armatures physically coupled to the core shaft, each armature spaced-apart from a neighboring armature a distance and electrically coupled to each neighboring armature;
   a first outer body coupled to a first plurality of magnetic assemblies, the first outer body surrounding the first plurality of magnetic assemblies; and a second outer body coupled to a second plurality of magnetic assemblies, the second outer body surrounding the second plurality of magnetic assemblies, wherein, for each armature, a first set of corresponding magnetic assemblies of the first plurality of magnetic assemblies and a second set of corresponding magnetic assemblies of the second plurality of magnetic assemblies surrounds the armature.

3. The downhole drilling system of claim 2, wherein each set of corresponding magnetic assemblies has a washer-type geometric shape.

4. The downhole drilling system of claim 2, wherein each magnetic assembly of each set of corresponding magnetic assemblies has a half-washer-type geometric shape.

5. The downhole drilling system of claim 1, wherein the axial-field multi-armature alternator system provides greater than 1 kW of power to the pulse-generating circuit.

6. The downhole drilling system of claim 1, wherein the axial-field multi-armature alternator system provides greater than 500 kW of power to the pulse-generating circuit.

7. The downhole drilling system of claim 1, wherein the pulse-generating circuit is physically positioned between the axial-field multi-armature alternator system and the drill bit.

8. The downhole drilling system of claim 1, further comprising a turbine mechanically coupled to the axial-field multi-armature alternator system.

9. The downhole drilling system of claim 1, wherein the electric pulse from the pulse-generating circuit applies a voltage of approximately 150 kV across the first electrode and the second electrode.

10. The downhole drilling system of claim 1, wherein the drill bit is one of an electrocrushing drill bit or an electro-hydraulic drill bit.

11. An axial-field multi-armature alternator system for providing power in a downhole drilling system, the system comprising:
a core shaft;
a plurality of armatures physically coupled to the core shaft, each armature spaced-apart from a neighboring armature a distance and electrically coupled to each neighboring armature;
a first outer body coupled to a first plurality of magnetic assemblies, the first outer body surrounding the first plurality of magnetic assemblies; and
a second outer body coupled to a second plurality of magnetic assemblies, the second outer body surrounding the second plurality of magnetic assemblies,
wherein, for each armature, a first set of corresponding magnetic assemblies of the first plurality of magnetic assemblies and a second set of corresponding magnetic assemblies of the second plurality of magnetic assemblies surrounds the armature.

12. The axial-field multi-armature alternator system of claim 11, wherein the core shaft passes through each of the armatures.

13. The axial-field multi-armature alternator system of claim 12, wherein each set of corresponding magnetic assemblies has a washer-type geometric shape.

14. The axial-field multi-armature alternator system of claim 13, wherein each magnetic assembly of each set of corresponding magnetic assemblies has a half-washer-type geometric shape.

15. The axial-field multi-armature alternator system of claim 11, wherein the first and the second outer body surround the plurality of armatures.

16. The axial-field multi-armature alternator system of claim 11, wherein the first outer body and the second outer body are rotatable around the core shaft.

17. The axial-field multi-armature alternator system of claim 11, further comprising a first and a second hub surrounding each armature.

18. The axial-field multi-armature alternator system of claim 11, further comprising a bearing coupled to the core shaft.

19. The axial-field multi-armature alternator system of claim 11, wherein the axial-field multi-armature alternator system is integrated within a bottom-hole assembly.

20. A method, comprising:
placing a drill bit downhole in a wellbore;
providing electrical power from an axial-field multi-armature alternator system to a pulse-generating circuit electrically coupled to the drill bit, the axial-field armature alternator system located downhole in the wellbore and including:
a core shaft,
a plurality of armatures physically coupled to the core shaft, each armature spaced-apart from a neighboring armature a distance and electrically coupled to each neighboring armature,
a first outer body coupled to a first plurality of magnetic assemblies, the first outer body surrounding the first plurality of magnetic assemblies, and
a second outer body coupled to a second plurality of magnetic assemblies, the second outer body surrounding the second plurality of magnetic assemblies,
wherein, for each armature, a first set of corresponding magnetic assemblies of the first plurality of magnetic assemblies and a second set of corresponding magnetic assemblies of the second plurality of magnetic assemblies surrounds the armature;
generating an electric pulse with the pulse-generating circuit;
forming an electrical arc between a first electrode and a second electrode of the drill bit;
fracturing a rock formation at an end of the wellbore with the electrical arc; and
removing fractured rock from the end of the wellbore.

* * * * *